US012247428B2

(12) United States Patent
Semineth

(10) Patent No.: US 12,247,428 B2
(45) Date of Patent: Mar. 11, 2025

(54) METHOD FOR ADJUSTING AN ADJUSTING PART ON A VEHICLE AND STORING SIGNAL CURVES AND MEASURED VALUE CURVES FOR SUBSEQUENT TESTING

(71) Applicant: BROSE FAHRZEUGTEILE SE & CO. KOMMANDITGESELLSCHAFT, BAMBERG, Bamberg (DE)

(72) Inventor: Marco Semineth, Bad Königshofen i. Gr. (DE)

(73) Assignee: BROSE FAHRZEUGTEILE SE & CO. KOMMANDITGESELLSCHAFT, BAMBERG (DE)

( * ) Notice: Subject to any disclaimer, the term of this patent is extended or adjusted under 35 U.S.C. 154(b) by 229 days.

(21) Appl. No.: 18/023,791

(22) PCT Filed: Aug. 24, 2021

(86) PCT No.: PCT/EP2021/073347
§ 371 (c)(1),
(2) Date: Feb. 28, 2023

(87) PCT Pub. No.: WO2022/043302
PCT Pub. Date: Mar. 3, 2022

(65) Prior Publication Data

US 2023/0243199 A1 Aug. 3, 2023

(30) Foreign Application Priority Data

Aug. 28, 2020 (DE) ..................... 10 2020 210 920.6

(51) Int. Cl.
*E05F 15/40* (2015.01)
*E05F 15/611* (2015.01)
*G01S 15/93* (2020.01)

(52) U.S. Cl.
CPC ............ *E05F 15/40* (2015.01); *E05F 15/611* (2015.01); *E05Y 2201/408* (2013.01);
(Continued)

(58) Field of Classification Search
CPC .... E05F 15/40; E05F 2015/483; G05B 11/28; G01S 15/93; G07C 5/0841; G08G 1/16
See application file for complete search history.

(56) References Cited

U.S. PATENT DOCUMENTS 7,688,013 B2 * 3/2010 Frommer ................ E05F 15/73 318/266
8,733,791 B2 * 5/2014 Ikuta ................ B60R 21/01332 180/274

(Continued)

FOREIGN PATENT DOCUMENTS

DE 102008048163 A1 3/2010
DE 102012023393 A1 6/2014

(Continued)

*Primary Examiner* — Tan Q Nguyen
(74) *Attorney, Agent, or Firm* — Dickinson Wright PLLC

(57) ABSTRACT

A method for adjusting an adjusting part of a vehicle including controlling by an electronic detection device configured to detect a potential obstacle in an adjustment path of the adjusting part based on at least one first measured value and generates at least one control signal. The method including storing and correlating, over a defined time period, at least one of a curve of the control signal the first measured value, and a curve of at least one second measured value changing significantly in response to a collision of the adjusting part and an obstacle for a subsequent plausibility check.

19 Claims, 5 Drawing Sheets

(52) U.S. Cl.
CPC ..... *E05Y 2201/434* (2013.01); *E05Y 2400/36* (2013.01); *E05Y 2400/44* (2013.01); *E05Y 2400/54* (2013.01); *E05Y 2900/531* (2013.01)

(56) References Cited

U.S. PATENT DOCUMENTS

| | | | |
|---|---|---|---|
| 10,538,149 | B1 | 1/2020 | DiCarlo et al. |
| 10,726,499 | B1 | 7/2020 | Konrardy et al. |
| 2011/0221584 | A1 | 9/2011 | Plankenhorn et al. |
| 2012/0109447 | A1 | 5/2012 | Yousefi et al. |
| 2012/0189447 | A1 | 7/2012 | Linow et al. |
| 2014/0156106 | A1 | 6/2014 | Niemann et al. |
| 2018/0216395 | A1 | 8/2018 | Naserian et al. |
| 2018/0371822 | A1* | 12/2018 | Rrumbullaku ....... H02H 7/0851 |
| 2020/0001827 | A1 | 1/2020 | Shirazi et al. |
| 2022/0243521 | A1* | 8/2022 | Herman .................... B60R 1/06 |

FOREIGN PATENT DOCUMENTS

| | | | |
|---|---|---|---|
| DE | 102014215430 | A1 | 2/2016 |
| DE | 102018101613 | A1 | 8/2018 |
| DE | 102017106749 | A1 | 10/2018 |
| EP | 3718850 | A1 | 10/2020 |
| KR | 20150003250 | U | 8/2015 |
| WO | 2015113137 | A1 | 8/2015 |

* cited by examiner

METHOD FOR ADJUSTING AN ADJUSTING PART ON A VEHICLE AND STORING SIGNAL CURVES AND MEASURED VALUE CURVES FOR SUBSEQUENT TESTING

CROSS-REFERENCE TO RELATED APPLICATIONS

This application is the U.S. National Phase of PCT Application No. PCT/EP2021/073347 filed on Aug. 24, 2021, which claims priority to German Patent Application No. DE 10 2020 210 920.6 Filed on Aug. 28, 2020.

TECHNICAL FIELD

The present disclosure relates to a method for adjusting an adjusting part on a vehicle.

BACKGROUND

The adjustment of an adjusting part on a vehicle, e.g., a vehicle door, a liftgate or a trunk lid, by taking account of a potential obstacle in an adjustment path of the adjusting part, is widely known. In this connection it is usual to provide an electronic detection device on the vehicle side, which detects a potential obstacle in the adjustment path of the adjusting part and possibly, i.e. on detection of a potential obstacle in the adjustment path, impedes, stops or reverses an adjustment of the adjusting part. Typically, the electronic detection device uses at least one capacitive sensor, at least one radar sensor and/or at least one ultrasonic sensor in order to detect whether a potential obstacle is present in an adjustment path of the adjusting part. A corresponding measured value of the respective sensor then is compared with a setpoint value, possibly plus a stored tolerance. By means of the electronic detection device a control signal then is generated for controlling the adjusting movement of the adjusting part, which is used to signal to a drive gear for the adjusting part whether an adjustment along the adjustment path is (still) possible. For example, when a vehicle door is opened with a potential obstacle in the adjustment path, opening is stopped or, when a door is opened manually, a warning is given of a possible collision with the detected obstacle, for example by a targeted increase in the operating force to be applied for the further adjustment.

Typically, the systems known from practice so far do not detect and store which environmental conditions exist during a possible detection of an obstacle. Also, a possible functional test of the electronic detection device merely is effected in operation, so that an alarm signal possibly is output in case of a malfunction. It is then stored at best that an error has occurred.

At the same time, a solution is required in technical terms, in which for the assessment of possible warranty claims it can be checked on the part of a manufacturer in how far an adjustment system for adjusting an adjusting part has properly worked when a collision with an obstacle actually as occurred. For example, in the event of a possible collision of a vehicle door, a liftgate or a trunk lid with an obstacle, it is of interest to be able to check in a workshop whether the collision has occurred due to a malfunction of the electronic detection device or whether any damage has been caused due to an incorrect operation and/or improper adjustment.

SUMMARY

Against this background one or more objects underlying the present disclosure may be to provide an improved adjustment system in this respect.

Accordingly, it is proposed that at least over a defined time period a curve of a control signal generated on the part of the electronic detection device and/or a curve of a first measured value, based on which a potential obstacle in an adjustment path of an adjusting part is detected, and a curve of at least one second measured value changing significantly in the event of a collision of the adjusting part with an obstacle can be stored so as to be read out and correlated with each other for a subsequent plausibility check.

According another embodiment, curves to be correlated with each other for particular measurement and/or signal quantities thus are stored in order to subsequently be able to infer e.g. any malfunctions of the electronic detection device or manipulations on the adjusting part with reference to the corresponding curves. The at least one second measured value here can originate from at least one sensor associated with the detection device and/or the second measured value can originate from at least one on-board sensor and such as an adjusting part-side sensor cross-linked with the electronic detection device, e.g. via a vehicle bus system. The sensor generates a second measured value that changes significantly in the event of a collision of the adjusting part with an obstacle, i.e. for example rises or falls characteristically, and hence provides an additionally evaluable quantity so that it can be identified with reference to the curve of this second measured value whether a collision with an obstacle actually has occurred. Due to the temporal correlation of the control signal and/or of the first measured value of the electronic detection device with such a second measured value, it thus is possible to subsequently check in how far the control signals generated before and at a time of collision and/or first measured values make a particular scenario for the collision of the adjusting part with the obstacle seem plausible. Thus, what is associated with the proposed solution may be an expansion of a collision protection sensor system provided by the electronic detection device in order to allow a subsequent analysis and/or reconstruction of possible collision cases. This is helpful, for example, in order to subsequently obtain information about the circumstances and the reason of any collision of the adjusting part with an obstacle and to be able to better assess any warranty risk for a manufacturer of the electronic detection device.

The at least one second measured value, as already indicated above, may originate from an on-board sensor cross-linked with the electronic detection device and possibly (at least not primarily) associated with the obstacle detection. It is decisive that the combination of the different signals and/or measured values and the readable storage thereof, for example in the form of an event protocol, provides for a subsequent plausibility check. As an example, a collision of an obstacle with the adjusting part may refer to the fact that the adjusting part collides with an obstacle during an adjusting movement or, vice versa, a moving obstacle collides with the stationary adjusting part.

As an example, a storage of the curves here can be triggered automatically, for example always when a potential obstacle in an adjustment path of the adjusting part is detected via the electronic detection device. For example, a storage of the curves can be triggered automatically when a potential obstacle in an adjustment path of the adjusting part yet to be adjusted or of the adjusting part already carrying out an adjusting movement is detected. The storage then is continued up to an end time, which is specified via an electronic control unit, for example by a defined time period of e.g. 5 seconds, and/or by a particular adjustment event of the adjusting part. Storage up to a particular adjustment event for example refers to the fact that the curves are stored from a detection of a potential obstacle in an adjustment path of the adjusting part until the respective adjusting part takes one of two possible end positions, for example a completely closed position, at the vehicle. For example, after the detection of an obstacle in an adjustment path of an adjusting part constituting a vehicle door, the curves are recorded and hence stored until a vehicle door is completely closed again and/or, by actuation of a door lock, locked to a vehicle body.

Alternatively or additionally, the time period over which the curves are stored, can be defined by means of the electronic detection device automatically and in dependence on a triggered adjusting movement of the adjusting part. In such an exemplary embodiment, the electronic detection device consequently triggers the storage of the corresponding curves, for example at the beginning of a manual or power-operated adjustment of the adjusting part, which is monitored by the electronic detection device, or when a potential obstacle in the adjustment path of the adjusting part is detected via the electronic detection device. Beforehand, for example, no curves of the control signal and/or of the first and second measured values are recorded and stored, respectively, in any case not permanently, although these signals and measured values are generated or detected.

To improve the handleability and temporal correlation of the stored curves, the curves can be stored together with at least one electronic time stamp. This for example includes the fact that the curves are recorded and stored with reference to a synchronous time system of the vehicle. The curves can be stored decentrally and for example, in an individual on-board controller, such as a controller of the electronic detection device and/or in memories of a plurality of sensors supplying the signals and measured values, decentrally and with a synchronous time stamp.

For the efficient use of storage capacities to be kept in stock for storing the curves, one design variant provides a temporary intermediate storage of the curves of the adjusting part. For example, a permanent storage of the curves in a storage device only can be effected when a potential obstacle is detected in the adjustment path of the adjusting part. In other words, in such a design variant the detected curves initially are cached temporarily and hence in a volatile way with each adjustment of the adjusting part. During a subsequent adjustment, for example a 3rd, 4th or 5th adjustment of the adjusting part, curves cached in this way are overwritten with new data. Thus, in a temporary memory, merely curves for a limited number of preceding adjustments of the adjusting part are stored. A permanent storage only is effected on detection of a potential obstacle in the adjustment path of the adjusting part. The corresponding curves for example are copied into the storage device in response to a detected obstacle or transmitted to the storage device for the permanent, non-volatile storage. The curves and associated data points, which otherwise are only stored temporarily, thus are only stored in a format intended for this purpose and in a separate memory area, so that they can be read out permanently when a potential obstacle in the adjustment path of the adjusting part to be adjusted in a power-operated way or manually has been detected via the electronic detection device.

Alternatively or additionally, curves initially cached temporarily can be permanently stored in a storage device upon detection of a collision of an obstacle with the adjusting part. Consequently, a permanent storage of the curves here is triggered when a collision of an obstacle with the adjusting part is detected electronically. For example, such a collision is detected with reference to the at least one second measured value and permanently stored together with the curves of the first measured value and/or of the control signal and of the second measured value. In this way, for example, it can subsequently be detected with reference to the data stored in this way whether a collision with an obstacle has been detected, without an adjustment of the adjusting part having occurred. For example, it can thereby be analyzed subsequently whether in the case of a vehicle door of a vehicle an obstacle possibly has collided with the vehicle door, without the vehicle door having been moved. With reference to the stored curves and data, respectively, so-called parking bumps can also be identified.

As an example, it can be provided in this connection that the curves are temporarily cached between two adjustments of the adjusting part. Thus, a corresponding system always stores the curves temporarily between two adjustments of the adjusting part. When a collision of an obstacle with the adjusting part occurs between these two adjustments, independently of whether or not the adjusting part is adjusted, a permanent storage of the curves to be correlated with each other is effected in order to be able to subsequently perform an analysis of the detected collision. For example, the curves repeatedly are cached temporarily over a defined minimum time period between two adjustments of the adjusting part. The curves for example can be cached temporarily from an adjustment of the adjusting part for at least 2 or 3 hours in order to ensure that even over a defined time period after completion of an adjustment data are available for a future analysis. This includes the possibility, for example, after a vehicle has been parked—and possibly additionally after one of the detected opening and subsequent closing movements of a vehicle door or liftgate—to perform the caching of the curves for a defined minimum time window, and/or to perform the same until a new adjusting movement of the respective vehicle door or liftgate is detected again. The temporarily cached curves will then be overwritten again only from this time.

Alternatively or additionally, it can be provided that the curves are temporarily cached as long as a standstill of the vehicle is detected electronically. Thus, from the time of parking the vehicle, the curves are cached temporarily so that in the case of a collision event possibly detected during the standstill of the vehicle it can be found out that this collision is effected with a non-moving adjusting part and hence cannot result from a possible malfunction of the detection device.

The at least one second measured value, which changes significantly in the event of a collision of the adjusting part with an obstacle, for example can be representative of an acceleration of the adjusting part, of a speed of a drive used for a power-operated adjustment of the adjusting part, or of a motor current of a drive used for a power-operated adjustment of the adjusting part. Consequently, the at least one second measured value can be based for example on the signal of at least one acceleration sensor, at least one velocity or speed sensor or at least one current sensor. It is also possible that a plurality of such second measured values can be stored in addition to a curve of the control signal and/or a curve of the first measured value so as to be read out in parallel for a subsequent plausibility check and to be correlated with each other.

For example, the detection device comprises at least one capacitive sensor, at least one ultrasonic sensor, at least one lidar sensor or at least one radar sensor, in order to contactlessly infer the presence of a potential obstacle in the adjustment path of the adjusting part.

For a simple and more easily automatable evaluation of stored data by means of the proposed solution, one design variant provides the additional storage of at least one collision information in the event of a detected collision of the adjusting part with an obstacle. The collision information indicates a successful and sensorially captured detection of a collision with an obstacle. A corresponding event protocol thus for example contains an indication of a detected collision event. This for example includes the fact that in the case of a detected collision event a corresponding data field is assigned the value “1” or otherwise the value “0” or no value. In this way, stored data and curves can selectively be filtered after detected collisions and hence be evaluated more specifically.

In one design variant, at least one person-specific parameter is stored alternatively or in addition to the curves. This person-specific parameter for example allows an evaluation as to whether during the adjustment of the adjusting part a person was staying in the surroundings of the vehicle, such as in the surroundings of the adjusting part. This, for example, means that via the person-specific parameter it can be evaluated whether during the adjustment of the adjusting part a person was staying in a defined radius around the vehicle, such as in a defined radius around the adjusting part at least briefly, i.e. for a period exceeding a stored threshold value. For storing the person-specific parameter, for example a signal of a key transponder coupled to the vehicle, of a mobile device coupled to the vehicle (such as of a smart phone with a corresponding software application) and/or of an environment sensor of the vehicle, which is indicative of the presence of a person, can be evaluated and/or stored. This allows to draw conclusions as to whether the adjustment of the adjusting part actually has been effected under an intended supervision of a user and/or as to how probable a collision of the adjusting part with a human obstacle was during the respective adjustment. In one or more embodiments, the evaluation of a key transponder or a mobile device allows the storage of a person-specific parameter, which not only is indicative of the fact that an arbitrary position in the surroundings of the vehicle was present at all during the adjustment of the adjusting part. Rather, this also allows to evaluate whether a user of the vehicle authenticated via the key transponder and/or the mobile device was staying nearby.

Alternatively or additionally, a possibly stored person-specific parameter can contain at least one item of identification information to be associated with a particular user of the vehicle. For example, when the vehicle had been unlocked by a particular authenticated user (by perhaps several possible authenticatable users) before an adjustment of the respective adjusting part, an item of identification information associated with this user is stored as a person-specific parameter, for example in the form of a unique identification number. Such an attributable item of identification information can be advantageous for example for the utilization of a vehicle as a rental car or car sharing vehicle, in order to associate possible damages of the adjusting part with a particular user of the vehicle.

The curves can be stored locally in an on-board storage device and/or via an Internet connection in a cloud memory. In principle, the curves can also be stored exclusively or redundantly locally and in a cloud memory. The local on-board storage device for example can comprise a local memory area of the electronic detection device, wherein the at least one second measured value and/or a system time for an electronic time stamp then are provided to this memory area, for example via a vehicle bus system, and therefor are transmitted to a controller of the electronic detection device. An on-board storage device for example can also be provided for a merely temporary volatile intermediate storage of the curves as mentioned above, while an additional cloud memory is used for the non-volatile storage of the curves on detection of a potential obstacle in the adjustment path of the adjusting part.

Another aspect of the proposed solution relates to a method for monitoring the adjustment of an adjusting part on a vehicle. An adjustment of the adjusting part also is controlled here by using an electronic detection device that detects a potential obstacle in an adjustment path of the adjusting part on the basis of at least one first measured value and generates at least one control signal for controlling the adjustment of the adjusting part. Furthermore, it is provided that at least over a defined time period a) a curve of a control signal and/or of the first measured value and/or of a position measurement value indicative of an adjustment position of the adjusting part as well as b) at least one second measured value significantly changing in the event of a collision of the adjusting part with an obstacle are stored so that they can be read out and be correlated with each other for a subsequent plausibility check.

The idea also underlying this further aspect of the solution is to provide data to be correlated with each other, with reference to which it can be checked in how far the electronic detection device has properly operated and/or an adjustment of the adjusting part actually was effected when a collision of the adjusting part with an obstacle has occurred.

Here again in principle, a collision of the adjusting part with an obstacle may refer to the fact that the moving adjusting part may have collided with a stationary obstacle or a moving obstacle may have collided with a stationary adjusting part. With reference to the control signal, the first measured value and/or the position measurement value, in conjunction with the at least one second measured value, it can be evaluated in what situation a collision was detected. For example, the position measurement value can be representative of an opening angle of a vehicle door or liftgate. When this position measurement value for example is used to indicate that the respective adjusting part was completely closed when a collision with the adjusting part was detected, this rather speaks for a collision of a moving obstacle with the stationary adjusting part. The collision of the adjusting part with the obstacle then has occurred independently of a possible impairment of the electronic detection device. For example, this is a so-called parking bump of a parked vehicle.

The proposed solution furthermore relates to an adjustment system for adjusting at least one adjusting part on a vehicle. A proposed adjustment system comprises an electronic detection device that is configured to detect a potential obstacle in an adjustment path of the adjusting part on the basis of at least one first measured value and to generate at least one control signal for controlling the adjustment of the adjusting part, i.e. for braking, blocking and/or reversing an adjusting movement of the adjusting part. The adjustment system here is configured to carry out a design variant of a proposed method and thus, for example, over at least a defined time period, to store a curve of the control signal and/or a curve of the first measured value as well as a curve of at least one second measured value of an on-board sensor, which changes significantly in the event of a collision of the adjusting part with an obstacle, so as to be read out and correlated with each other for a subsequent plausibility check.

A proposed adjustment system may include an interface for reading out the stored data comprising the curves and/or an interface to a cloud memory in which the data comprising the curves are readably stored.

Furthermore, the proposed solution comprises a computer program product for an electronic control unit of an adjustment system. This computer program product contains instructions which on execution of the instructions cause at least one processor of the electronic control unit to carry out a design variant of a proposed method.

The attached Figures by way of example illustrate possible design variants of the proposed solution.

Figure 5:
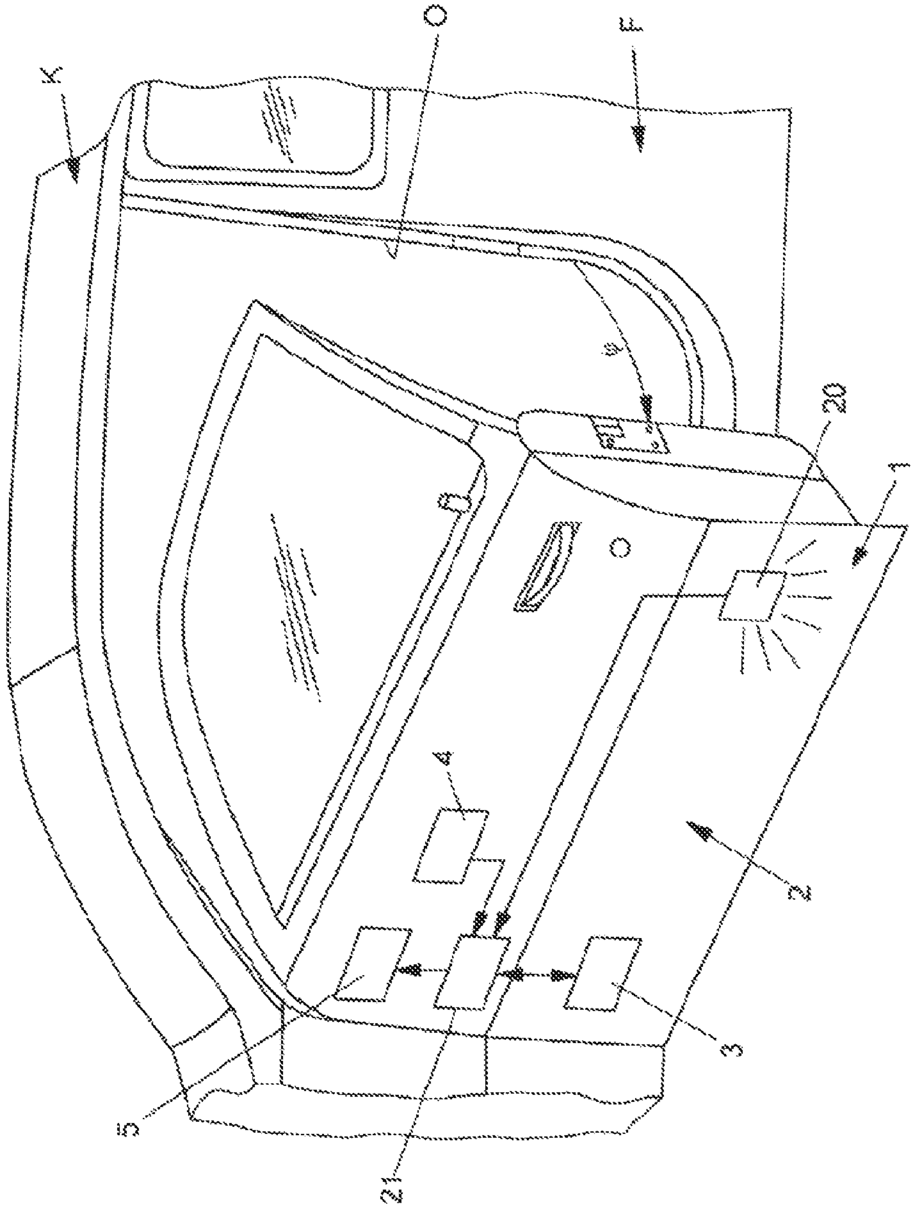
FIG. 5 in a side view and sectionally shows a vehicle with a design variant of a proposed adjustment system, which is utilized for generating the signal and measured value curves shown in FIGS. 1 to 4.

With a view to the driver side, FIG. 5 sectionally shows a vehicle F in which a body opening O in a body K of the vehicle F can be closed by an adjusting part in the form of a lateral vehicle door 1. The vehicle door 1 can be pivoted along an adjustment path from a completely closed position into a maximally open adjustment position on the body K. The vehicle door 1 of FIG. 5 can be opened and closed manually. Alternatively or additionally, a power-operated adjustment of the vehicle door 1 is possible. A respective pivot position of the vehicle door 1 and hence an adjustment position of the vehicle door 1 is defined by an opening angle φ. This opening angle φ can be electronically detected and evaluated as a position measurement value that is indicative of the current adjustment position of the vehicle door 1 with respect to the body K.

DETAILED DESCRIPTION

Independently of the kind of adjustment, there is provided an electronic detection device 2 by means of which an obstacle can be detected in an adjustment path of the vehicle door 1. The electronic detection device for example is used to monitor an adjustment range of the vehicle door 1 on opening, in order to prevent a collision of the vehicle door 1 with an obstacle. During a manual adjustment, the electronic detection device 2 for example generates an alarm signal and/or increases an operating force to be applied for the adjustment and hence the further opening of the vehicle door 1, so that it becomes noticeably more difficult for a user to further open the vehicle door 1. During a power-operated adjustment of the vehicle door 1, a triggered adjustment of the vehicle door 1 is inhibited when an obstacle is detected in the adjustment path, so that the vehicle door 1 for example remains in its closed position. Alternatively or additionally, a power-operated and hence motor-controlled adjusting movement of the vehicle door 1 is stopped and/or reversed when an obstacle is detected, in order to prevent a collision of the vehicle door 1 with an obstacle on opening (or closing).

For the detection of a potential obstacle in the adjustment path of the vehicle door 1, the electronic detection device 2 comprises at least one obstacle sensor, in the present case for example in the form of a radar sensor or ultrasonic sensor 20. On the basis of first measured values generated by this radar sensor or ultrasonic sensor 20 it can be electronically inferred whether an obstacle is present in front of the vehicle door 1 to be adjusted and hence in its adjustment path.

First measured values detected by the radar sensor or ultrasonic sensor 20 are transmitted to an electronic control unit 21 of the electronic detection device 2. This electronic control unit 21 includes an evaluation logic, for example implemented in a microcontroller including at least one processor. In the electronic control unit 21, a comparison of the received first measured values of the radar sensor or ultrasonic sensor 20 with at least one stored threshold value can be used to evaluate whether an obstacle possibly is present in the adjustment path of the vehicle door 1.

The electronic control unit 21 can send a control signal to a door-side drive gear 3 in order to control the adjusting movement of the vehicle door 1. Via a corresponding control signal of the electronic control unit 21, a braking force counteracting the adjustment consequently can be generated for example in the event of a manual adjustment of the vehicle door 1, which leads to an increase of the operating force required for the adjustment. In the event of a power-operated adjustment of the vehicle door 1, the drive gear 3 can stop and/or reverse an adjusting movement of the vehicle door 1 in response to a corresponding control signal of the electronic control unit 21, so that a collision with an obstacle in the adjustment path of the vehicle door 1 thereby is excluded.

In the exemplary embodiment shown in FIG. 5, the electronic control unit 21 of the electronic detection device 2 among other things is additionally coupled to a door-side acceleration sensor 4 or the electronic control unit 21 includes an acceleration sensor 4. The acceleration sensor 4 can generate an acceleration signal that is representative of an acceleration of the vehicle door 1. In addition, the drive gear 3 can transmit a velocity or speed signal to the control unit 21, which is representative of a speed with which a motor drive of the drive gear 3 drives the vehicle door 1. Alternatively or additionally, the drive gear 3 can transmit a motor current signal and hence a (further) second measured value, which is representative of a motor current needed by a motor drive of the drive gear 3, to the electronic control unit 21.

Combined with the first measured values of the radar sensor or ultrasonic sensor 20, second measured values supplied by sensors of the drive gear 3 and/or the acceleration sensor 4 allow to draw conclusions as to possible malfunctions of the electronic detection device 2 and also to possible manipulations or incorrect operations of the vehicle door 1. A controller including the electronic control unit 21 therefor can be cross-linked with a controller of the drive gear 3 or with a controller of the vehicle F using acceleration signals of the acceleration sensor 4, e.g., via a vehicle bus system.

A design variant of the proposed solution provides to store, at least for a defined time period, a curve of the first measured values supplied by the radar sensor or ultrasonic sensor 20, a curve of control signals transmitted by the electronic control unit 21 to the drive gear 3 and at least second measured values, which can be read out from the acceleration sensor 3 and/or from the drive gear 3 and can be correlated with each other for a subsequent plausibility check, in a storage device 5. The storage device 5 includes an interface for reading out data stored therein. The storage device 5 can be provided locally in a controller of the electronic detection device 2. Alternatively or additionally, the storage device 5 can form part of a cloud memory that can be addressed by the electronic control unit 21 of the electronic detection device 2 via an Internet interface of the vehicle F.

Via the curves stored in the storage device 5 and representative of an adjusting movement of the vehicle door 1 and via the data formed therewith, respectively, it can subsequently be evaluated and hence be made plausible for example whether an obstacle in the adjustment path of the vehicle door 1 has correctly been identified by the electronic detection device 2 and the vehicle door 1 nevertheless has collided with the obstacle, or whether for example a collision with an obstacle has occurred, as the electronic detection device 2 previously has detected no obstacle by mistake. This is of considerable economic interest, such as in view of possible warranty claims. The proposed solution creates the technical prerequisites therefor.

It is provided for example that via the electronic detection device 2 a storage of the aforementioned curves is triggered automatically when an adjusting movement of the vehicle door 1 is effected. The curves initially can be stored temporarily and hence be cached in a volatile way with each adjustment of the vehicle door 1 so that from a certain number of adjustments previous curves are again overwritten. When during an adjustment of the vehicle door 1 the electronic detection device 2 of the illustrated adjustment system has detected an obstacle in the adjustment path, the previously merely temporarily cached curves are transmitted into the storage device 5, in which the curves then remain stored permanently and hence in a non-volatile way. The curves are stored together with at least one electronic time stamp and hence for example synchronized with an on-board time system, so that the curves and the data generated therewith can be evaluated in the manner of an event protocol. Such an event protocol then for example not only contains possible control commands, the curve of the opening angle φ and/or accelerations detected by means of the acceleration sensor 4, but also status information of the respective sensors, a possible slope of the vehicle F, information on the opening angle φ for which a collision has been detected and/or available information of other sensors, such as e.g. of a so-called "corner radar", which is provided on the vehicle F for detecting cyclists for a lane change or turn.

In the illustrated design variant, a temporary storage of detected curves with a parking vehicle F furthermore can also be effected, and for example, independently of an adjusting movement of the vehicle door 1. A permanent storage of the previously cached curves in the storage device 5 is effected when a collision with an obstacle has been electronically detected on the vehicle door 1 for a parking vehicle F. Even with a non-moving vehicle door 1 it can thus easily be detected via the radar sensor or ultrasonic sensor 20 whether the stationary vehicle door 1 collides with a moving obstacle. With reference to the permanently stored curves it thus is possible to make a statement as to whether the collision has occurred with a stationary vehicle door 1, and for example, that such collision then cannot result from a possible malfunction of the electronic detection device 2. This might rather be a so-called parking pump or some other collision which indicates that the vehicle door F has been damaged by third parties.

In principle, the permanently stored curves can also be stored linked with a date-Latin and time indication.

In one design variant, the electronic control unit 21 of the electronic detection device 2 furthermore can receive at least one person-specific parameter via the vehicle bus system for storage in the storage device 5. Such a person-specific parameter signals for example whether a person, for example, an authenticated user, has been staying in the surroundings of the vehicle door 1 during an adjustment of the vehicle door 1. Alternatively or additionally, the at least one person-specific parameter can contain an item of identification information to be associated with a particular user of the vehicle F, for example an identification number that is associated with that user, or a particular vehicle key or mobile device via which the vehicle F was opened before the adjustment of the vehicle door 1 has been effected.

As is illustrated in FIGS. 1 to 4 with reference to different signal curves, it can easily be analyzed via an already small number of curves recorded and stored so as to be read out and correlated with each other, as to whether and how a possible collision event has occurred on the vehicle door 1.

Figure 1:
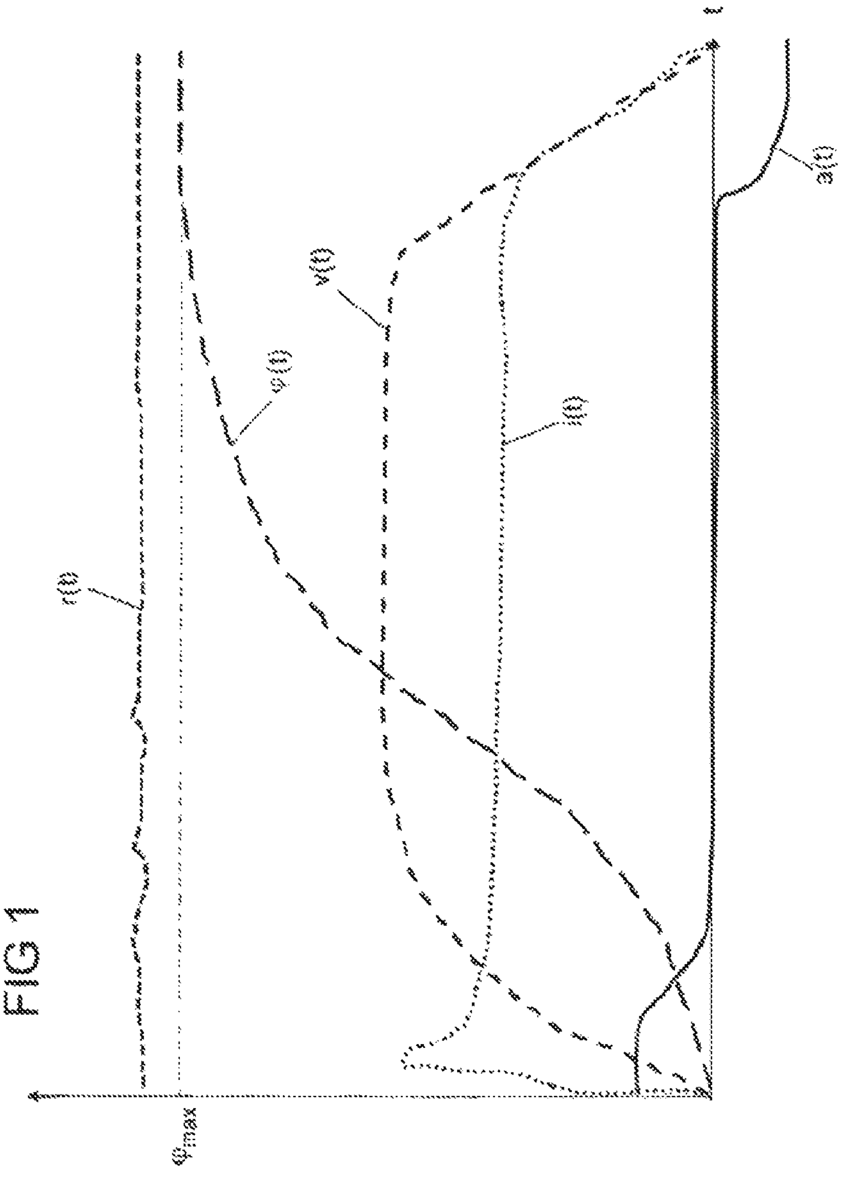
FIGS. 1-4 show various exemplary signal and measured value curves for different scenarios of an adjusting movement of an adjusting part in the form of a vehicle door.

FIG. 1 by way of example shows different signal curves over the time t for an obstacle-free opening movement of the vehicle door 1 from a completely closed position at the vehicle F. The electronic control unit 21 of the electronic detection device 2 here specifies a control signal in the form of a target angle signal r(t) on the basis of first measured values that are generated by the radar sensor or ultrasonic sensor 20. In the case of an obstacle-free adjustment, this target angle signal r(t) always lies above a constructional maximally possible opening angle $\varphi_{max}$ of the vehicle door 1. In other words, during obstacle-free opening an opening angle φ(t) of the vehicle door 1 can approach and finally reach this maximum opening angle $\varphi_{max}$ without the specified target angle signal r(t) of the drive gear 3 signaling to the vehicle door 1 to first stop an opening movement of the vehicle door 1.

As is illustrated with reference to the curves shown in FIG. 1 for a motor current i(t), an acceleration a(t) of the vehicle door 1 measured by the acceleration sensor 4, and a speed v(t) of a drive motor of the drive gear 3 driving the opening movement of the vehicle door 1, the corresponding signal curves show an image consistent therewith. The vehicle door 1 initially is accelerated and then braked again towards the end of the adjusting movement. The initial acceleration of the vehicle door 1 involves an increased demand for electricity, which then remains comparatively constant and decreases again towards the end of the adjusting movement. Correspondingly, the drive motor also initially rotates at increasing speed until a constant adjustment speed of the vehicle door 1 is reached and the same decreases again before reaching the maximally open position.

Figure 2:
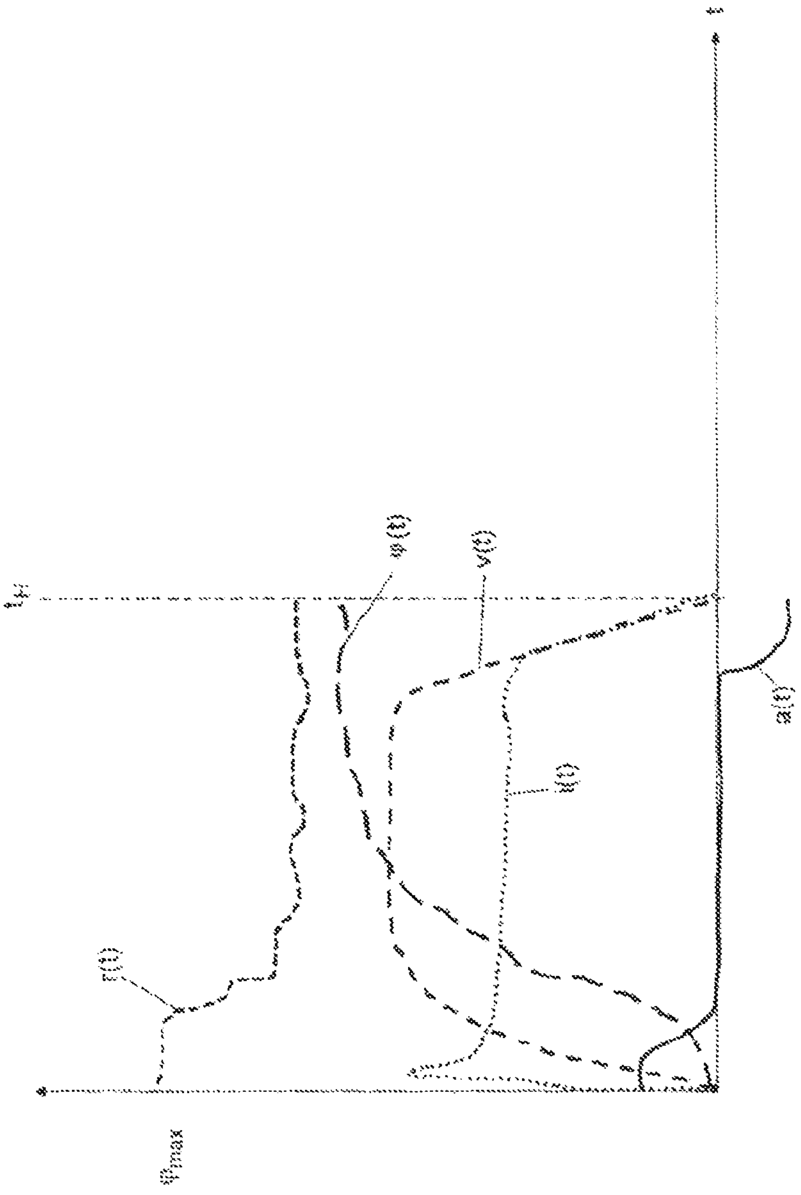

The signal and measured value curves of FIG. 2 are based on a scenario in which an obstacle in the adjustment path of the vehicle door 1 is properly detected in a contactless way via the electronic detection device 2 and the adjusting movement of the vehicle door 1 is limited and stopped in a targeted way in response thereto. The different stored curves here show an image that differs from FIG. 1, but nevertheless is characteristic. The target angle signal r(t) output due to an obstacle detected in the adjustment path specifies a maximum permitted opening angle which is smaller than the maximum opening angle $\varphi_{max}$. Consequently, the vehicle door 1 is opened merely up to a time $t_H$ and in doing so only up to a smaller opening angle. The speed v of the drive motor and its motor current i decrease in a defined way at the end of the adjusting movement in order to stop the vehicle door 1 in front of the potential obstacle. Correspondingly, the vehicle door 1 is negatively accelerated in a targeted way and hence undergoes a negative acceleration a before the time $t_H$.

Figure 3:
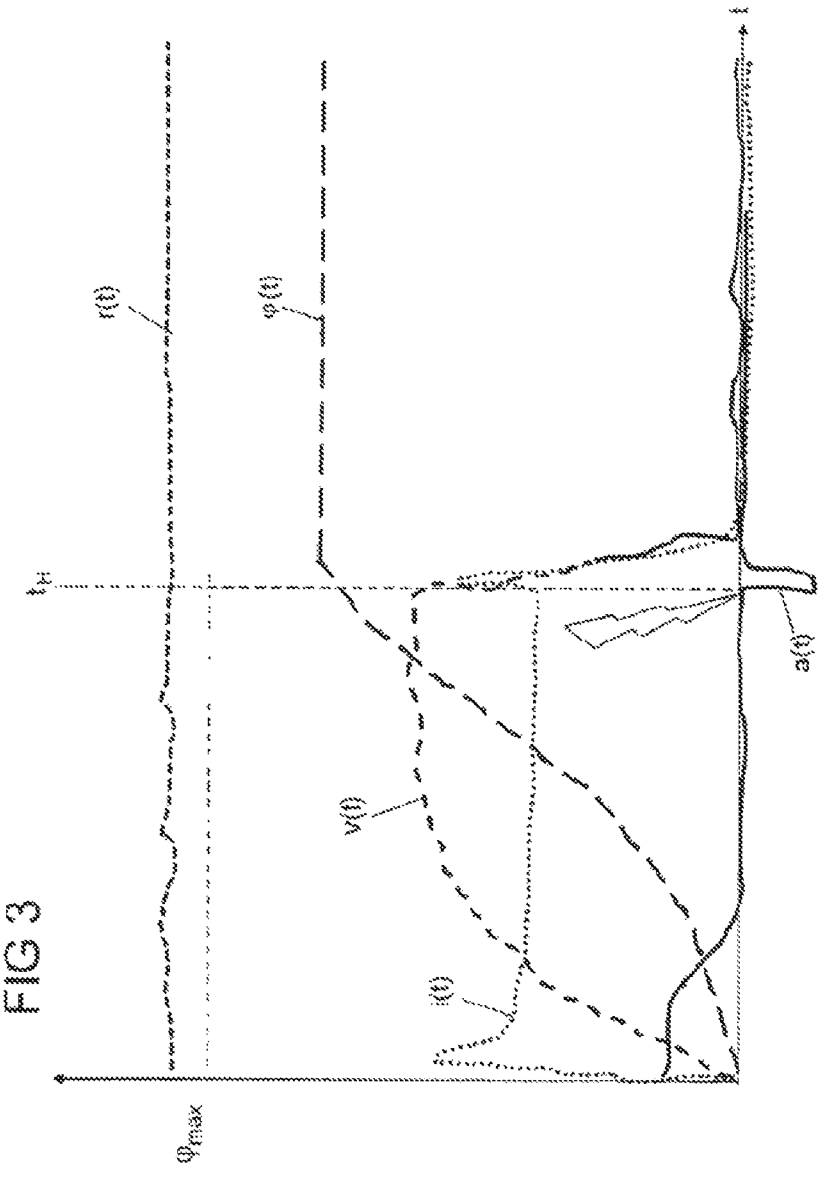

The signal curves of FIG. 3 on the other hand are exemplary for a malfunction of the electronic detection device 2. Here, no reduced opening angle is specified for the vehicle door 1 via the target angle signal r(t). The electronic detection device 2 and for example, its radar sensor or ultrasonic sensor 20 consequently have not detected any obstacle in the adjustment path of the vehicle door 1. Nevertheless, an abrupt stop of the vehicle door 1 occurs at the time $t_H$, which is revealed by characteristic drops in the acceleration, motor current and speed signals. After the time $t_H$, the opening angle φ furthermore remains at a constant value below the maximum opening angle $\varphi_{max}$.

Figure 4:
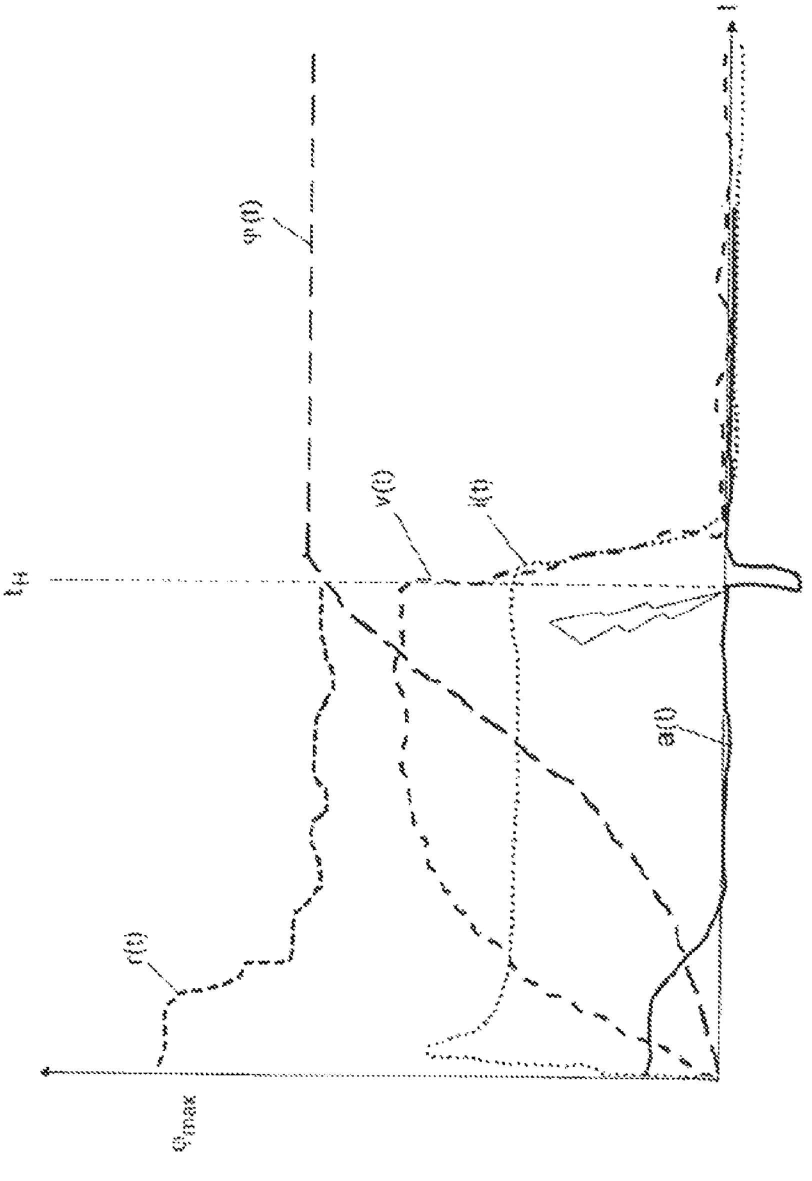

On the other hand, the signal curves of FIG. 4 reveal a scenario in which the electronic detection device 2 has identified a potential obstacle in the adjustment path of the vehicle door 1 and therefor has specified a reduced opening angle for the vehicle door 1 via the target angle signal r(t). As the adjusting movement of the vehicle door 1 correspondingly is to be stopped via the drive gear 3, a manual intervention however obviously occurs and the vehicle door 1 is adjusted further in the opening direction. Due to the manual intervention, the drive gear 3 here by way of example changes into a servo mode so that the motor current signal i(t) remains unchanged. This change can be detected electronically and can likewise be stored via a corresponding parameter. Without a change into a servo mode, the motor current i(t) would rise again, before an abrupt stop of the vehicle door 1 then occurs due to an obvious collision with an obstacle.

The different curves of FIGS. 1 to 4 clearly show that the different signal curves synchronized with a time stamp can be used to provide readable data to be correlated with each other, in order to plausibilize measured values and signals as well as alleged collision events subsequently detected and generated by the electronic detection device 2. Via the selectively and automatically stored signal curves, which originate from the electronic detection device 2 and its sensor system comprising the radar sensor or ultrasonic sensor 2 as well as on-board or door-side sensors cross-linked with the electronic detection device 2, different "use cases" thus can be distinguished from each other. With reference to the signal curves for instance a trouble-free function, such as an obstacle-free door opening or an avoided obstacle collision with a stop in front of a detected obstacle, can easily be distinguished from an obstacle collision caused by third parties or a malfunction of components of the electronic detection device 2. With reference to the signals for the acceleration a of the vehicle door 1, for the speed v and for the motor current i of a drive motor of the drive gear 3 combined with measured value and/or signal curves from the electronic detection device 2 it can easily be reconstructed in this way whether the vehicle door 1 has collided with a rigid or softer obstacle. This likewise permits to subsequently make a plausibility check of a damage possibly detectable on the vehicle door or of a scenario underlying this damage.

LIST OF REFERENCE NUMERALS

1 vehicle door (adjustment part)
2 detection device
20 radar sensor/ultrasonic sensor (obstacle sensor)
21 electronic control unit
3 drive gear
4 acceleration sensor
5 storage device
F vehicle
K body
O body opening
φ opening angle (position measurement value)

The invention claimed is:

1. A method of adjusting an adjusting part of a vehicle, the method comprising:

adjusting the adjusting part of the vehicle;

detecting, by an electronic detection device, a potential obstacle in an adjustment path of the adjusting part based on at least one first measured value, measured by the electronic detection device;

generating at least one control signal to control the adjustment of the adjusting part; and storing at least one of: (a) a first curve of the control signal over a first defined time period in response to the adjusting part colliding with an obstacle and (b) a second curve over a second defined time period extending between the at least one first measured value and at least one second measured value measured by the electronic detection device, in response to the adjusting part colliding with the obstacle; and correlating the curve of the control signal and the at least one first measured value and the at least one second measured value with each other.

2. The method of claim 1, wherein the storing step is triggered automatically in response to the detecting step.

3. The method of claim 1, further comprising:

defining, by the electronic detection device, at least one of the first defined time period and the second defined time period, in response the adjustment step.

4. The method of claim 1, wherein the storing step includes storing at least one of the first and second curves and at least one electronic time stamp.

5. The method of claim 1, further comprising:

temporarily caching at least one of the first and second curves in response to at least one of:

(a) the detecting step and (b) detecting the obstacle colliding with the adjusting part.

6. The method of claim 5, wherein the temporarily caching step is performed for each adjustment of the adjusting part.

7. The method of claim 5, wherein the temporarily caching step includes temporarily caching the first and second curves between two adjustments of the adjusting part.

8. The method of claim 7, wherein the temporarily caching step includes repeatedly temporarily caching the first and second curves over a defined minimum time period between the two adjustments of the adjusting part.

9. The method of claim 1, wherein the at least one second measured value is representative of at least one of an acceleration of the adjusting part, a speed of a drive configured for power-operated adjustment of the adjusting part, and a motor current of the drive.

10. The method of claim 1, wherein the electronic detection device comprises at least one capacitive sensor, an ultrasonic sensor, a lidar sensor, and a radar sensor.

11. The method of claim 1, further comprising:

storing at least one item of collision information in response to detecting the adjusting part colliding with the obstacle, the at least one item of collision information indicative of a successful detection of the obstacle.

12. The method of claim 1, further comprising:

storing at least one person-specific parameter including at least one item of identification information associated with a user of the vehicle; and evaluating, by the electronic detection device, whether the user is disposed in surroundings of the vehicle during the adjustment of the adjusting part.

13. The method of claim 1, wherein the first and second curves are stored locally in an on-board storage device (5) and/or via an Internet connection in a cloud memory.

14. A computer program product for use in an electronic control unit of an adjustment system for a vehicle, the computer program comprising:

instructions configured cause at least one processor of the electronic control unit to carry out the method of claim 1.

15. The method of claim 1, further comprising:

completing, by the electronic detection device, a plausibility check for a subsequent adjustment of the adjusting part and detection of another potential obstacle.

16. A method for of monitoring an adjustment of an adjusting part of a vehicle, the method comprising:

adjusting the adjusting part along an adjustment path;

controlling, by an electronic detection device, the adjustment of the adjusting part;

detecting, by the electronic detection device, a potential obstacle in the adjustment path at least based on one first measured value;

generating at least one control signal for controlling the adjustment of the adjusting part; and storing, by the electronic detection device over a defined time period, at least one of (a) a curve of the at least one control signal, (b) the first measured value, (c) a position measurement value indicative of an adjustment position of the adjusting part and at least one second measured value significantly changing in response to a collision of the adjusting part.

17. The method of claim 16, further comprising:

correlating the curve of the at least one control signal, the first measured value, the position measurement value, and the at least one second measured value to one another.

18. The method of claim 16, further comprising:

storing identification information associated with a user of the vehicle; and evaluating, by the electronic detection device, whether the user is disposed in a predefined radius of the vehicle.

19. The method of claim 16, further comprising:

temporarily caching at least one of (a) a curve of the at least one control signal, (b) the first measured value, (c) a position measurement value indicative of an adjustment position of the adjusting part and at least one second measured value significantly changing in response to a collision of the adjusting part.

* * * * *